US009514129B2

(12) United States Patent
Poisner et al.

(10) Patent No.: US 9,514,129 B2
(45) Date of Patent: Dec. 6, 2016

(54) TECHNOLOGIES FOR PROVIDING TEXTUAL INFORMATION AND SYSTEMS AND METHODS USING THE SAME

(71) Applicants: David Poisner, Carmichael, CA (US); Sarah R. Poisner, Carmichael, CA (US)

(72) Inventors: David Poisner, Carmichael, CA (US); Sarah R. Poisner, Carmichael, CA (US)

(73) Assignee: INTEL CORPORATION, Santa Clara, CA (US)

(*) Notice: Subject to any disclaimer, the term of this patent is extended or adjusted under 35 U.S.C. 154(b) by 112 days.

(21) Appl. No.: 14/335,290

(22) Filed: Jul. 18, 2014

(65) Prior Publication Data

US 2016/0019895 A1    Jan. 21, 2016

(51) Int. Cl.
| | |
|---|---|
| H04W 4/00 | (2009.01) |
| H04M 3/42 | (2006.01) |
| G06F 17/28 | (2006.01) |
| H04W 4/12 | (2009.01) |
| G10L 15/26 | (2006.01) |
| G10L 21/0208 | (2013.01) |

(52) U.S. Cl.
CPC ............ *G06F 17/289* (2013.01); *G10L 15/26* (2013.01); *H04W 4/12* (2013.01); *G10L 21/0208* (2013.01)

(58) Field of Classification Search
CPC .......... H04W 4/14; H04W 4/12; H04W 84/12; H04W 48/10; H04W 4/08; H04L 12/5895; H04M 2201/40; H04M 2201/60; H04M 3/42221; H04M 1/274516

USPC ................ 455/466, 414.1, 414.3, 414.4, 416
See application file for complete search history.

(56) References Cited

U.S. PATENT DOCUMENTS

| | | | | |
|---|---|---|---|---|
| 6,816,468 | B1 * | 11/2004 | Cruickshank | H04L 12/1813 370/260 |
| 7,542,900 | B2 * | 6/2009 | Droppo | G10L 21/0208 704/226 |
| 8,924,578 | B2 * | 12/2014 | Schmidt | H04L 12/587 370/428 |
| 8,983,844 | B1 * | 3/2015 | Thomas | G10L 15/30 704/226 |
| 2004/0062367 | A1 * | 4/2004 | Fellenstein | H04M 3/53333 379/88.22 |
| 2005/0068572 | A1 * | 3/2005 | Hart | H04N 1/00127 358/1.15 |
| 2005/0175190 | A1 * | 8/2005 | Tashev | H04R 3/005 381/92 |
| 2006/0259474 | A1 * | 11/2006 | Granito | H04L 12/581 |
| 2006/0276213 | A1 * | 12/2006 | Gottschalk | H04W 4/10 455/518 |

(Continued)

*Primary Examiner* — Dung Hong
(74) *Attorney, Agent, or Firm* — Grossman, Tucker, Perreault & Pfleger, PLLC

(57) ABSTRACT

Technologies for providing textual information are described. In some embodiments the technologies include an audio sensor, a loudspeaker, and a voice to text server. The audio sensor may function to detect an audio input and produce a first signal containing auditory information. The auditory information may be conveyed to the loudspeaker and the voice to text server. The voice to text server may function to convert the auditory information to textual information and transmit the textual information to one or more client devices, e.g., in a text message. Systems, methods, and devices including or utilizing such technology are also described.

25 Claims, 4 Drawing Sheets

(56) References Cited

U.S. PATENT DOCUMENTS

| | | | | |
|---|---|---|---|---|
| 2008/0227385 A1* | 9/2008 | Bappu | H04L 12/189 | |
| | | | 455/3.06 | |
| 2009/0135741 A1* | 5/2009 | Mykhalchuk | H04L 12/1827 | |
| | | | 370/260 | |
| 2011/0035390 A1* | 2/2011 | Whitehouse | H04L 63/1425 | |
| | | | 707/755 | |
| 2012/0029917 A1* | 2/2012 | Chang | H04L 12/588 | |
| | | | 704/235 | |
| 2012/0278104 A1* | 11/2012 | Traughber | G08B 25/016 | |
| | | | 705/3 | |
| 2014/0129210 A1* | 5/2014 | Convertino | G06F 17/30707 | |
| | | | 704/9 | |
| 2014/0273910 A1* | 9/2014 | Ballantyne | H04W 4/22 | |
| | | | 455/404.1 | |
| 2014/0358516 A1* | 12/2014 | Lin | G06F 17/289 | |
| | | | 704/2 | |
| 2015/0317975 A1* | 11/2015 | Ruiz Rodriguez | H04M 3/533 | |
| | | | 704/235 | |
| 2016/0164979 A1* | 6/2016 | Poscher | H04L 65/1016 | |
| | | | 370/259 | |

\* cited by examiner

TECHNOLOGIES FOR PROVIDING TEXTUAL INFORMATION AND SYSTEMS AND METHODS USING THE SAME

TECHNICAL FIELD

The present disclosure generally relates to technologies for providing textual information and systems and methods using the same. More particularly, the present disclosure relates to technologies in which auditory information produced by or in connection with a public address system is converted to textual information, which is subsequently provided to one or more client devices.

BACKGROUND

Public address systems are commonly used to make announcements or otherwise convey information to attendees at live events (e.g., meetings, sporting events, concerts, etc.). Frequently a public address system is used to amplify the volume of the voice of an announcer at the event, in an attempt to allow attendees to hear what the announcer is saying. Regardless, attendees at an event are often unable to clearly hear announcements made via a public address system. This issue may be attributable to a variety of factors, such as poor sound quality, high noise (e.g., from a crowd), the location of an attendee at the time the announcement is made (e.g., in the bathroom), etc. Some attendees at live events may therefore miss public address announcements, despite attempts to hear and understand them.

Many public address systems are also ill equipped to serve the needs of attendees that may suffer from one or more disabilities, such as hearing impairment. Indeed such attendees may not be able to hear or understand announcements made via a public address system, even if other attendees may be able to hear and understand such announcements. For these and other reasons, some public address systems include a display (e.g., electronic signage) on which text relating to an auditory announcement may be displayed. Although effective in some circumstances, such displays often only display text correlating to an auditory announcement for a limited period of time. The display may also be positioned such that not all attendees can view the text, and/or it may display text that is in a language that one or more attendees may not understand. Moreover, the displayed text often differs from the content of a spoken announcement, e.g., made by a public address announcer.

Finally in many events a public address system may not be provided, or may be provided but would disturb the event if used to provide auditory announcements to attendees in particular locations. In such instances it may be difficult to provide announcements of interest to some attendees, particularly those that are located in a location where auditory announcements may be disruptive.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Figure 1:
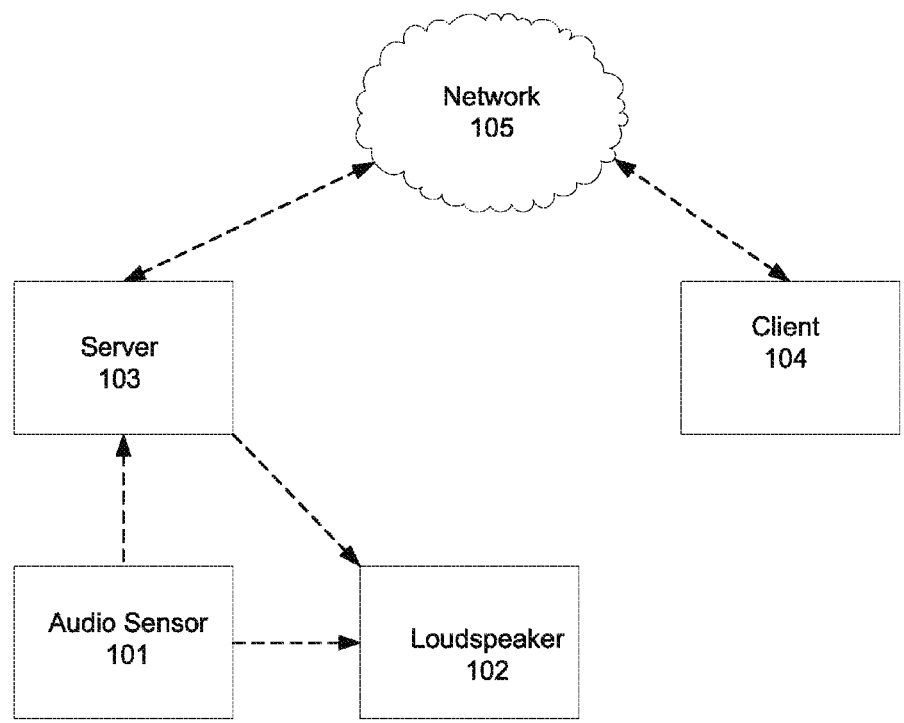
FIG. 1 illustrates an example system for providing textual information consistent with the present disclosure.

While the present disclosure is described herein with reference to illustrative embodiments for particular applications, it should be understood that such embodiments are exemplary only and that the invention as defined by the appended claims is not limited thereto. Indeed for the sake of illustration the technologies described herein may be discussed in the context of one or more use models in which textual information is provided and/or received in connection with a public address system at large event, such as a sporting event. Such discussions are exemplary only, and it should be understood that all or a portion of the technologies described herein may be used in other contexts. Those skilled in the relevant art(s) with access to the teachings provided herein will recognize additional modifications, applications, and embodiments within the scope of this disclosure, and additional fields in which embodiments of the present disclosure would be of utility.

The technologies described herein may be implemented using one or more devices, e.g., in a client-server architecture. The terms "device," "devices," "electronic device" and "electronic devices" are interchangeably used herein to refer individually or collectively to any of the large number of electronic devices that may be used as a client and/or a server consistent with the present disclosure. Non-limiting examples of devices that may be used in accordance with the present disclosure include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, ultra-mobile personal computers, wired telephones, combinations thereof, and the like. Such devices may be portable or stationary. Without limitation, the client and/or server devices described herein are preferably in the form of one or more cellular phones, desktop computers, electronic readers, laptop computers, set-top boxes, smart phones, tablet personal computers, televisions, or ultra-mobile personal computers.

The terms "client" and "client device" are interchangeably used herein to refer to one or more electronic devices that may perform client functions consistent with the present disclosure. In contrast, the terms "server" and "server device" are interchangeably used herein to refer to one or more electronic devices that may perform server functions consistent with the present disclosure.

Many of the FIGS. illustrate exemplary systems in accordance with the present disclosure as including a single client and a single server. Such illustrations are for the sake of example, and it should be understood that any number of clients and servers may be used. Indeed, the technologies described herein may be implemented with a plurality (e.g., 2, 5, 10, 20, 50, 100, 1000, 10,000 or more) client and/or server devices. Moreover the number of servers need not correlate to the number of clients. Indeed in some embodiments the technologies described herein utilize relatively few (e.g., 1 or 2) servers to support a relatively large number (e.g., 100, 1000, 10,000) etc. clients. Therefore while the present disclosure may refer to a client and/or a server in the singular, such expressions should be interpreted as also encompassing the plural form. Similarly, the designation of a device as a client or server is for clarity, and it should be understood that in some embodiments a client device may be configured to perform server functions, and a server device may be configured to perform client functions consistent with the present disclosure.

The terms "audio" and "auditory information" are interchangeably used herein to refer to sound, either as original produced by a source or when recorded, transmitted, and/or reproduced, enhanced, etc. e.g., by audio equipment. Audio and auditory information should therefore be understood to refer to information which may be heard or is capable of being heard, e.g., by a human listener. In contrast, the terms "text" and "textual information" refers to information that may be read or is capable of being read, e.g., by a human recipient thereof.

As used in any embodiment herein, the term "module" may refer to software, firmware, circuitry configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more devices, as defined previously. In some embodiments one or more modules described herein may be in the form of logic that is implemented at least in part in hardware to perform one or more client and/or server functions consistent with the present disclosure.

The phrase "close range communication network" is used herein to refer to technologies for sending/receiving data signals between devices that are relatively close to one another, i.e., via close range communication. Close range communication includes, for example, communication between devices using a BLUETOOTH™ network, a personal area network (PAN), near field communication, a ZigBee network, a wired Ethernet connection, combinations thereof, and the like. In contrast, the phrase "long range communication network" is used herein to refer to technologies for sending/receiving data signals between devices that are a significant distance away from one another, i.e., using long range communication. Long range communication includes, for example, communication between devices using a WiFi network, a wide area network (WAN) (including but not limited to a cell phone network (3G, 4G, etc. and the like), the internet, telephony networks, combinations thereof, and the like.

The present disclosure generally relates to technologies for providing textual information to one or more client devices. As will be described in detail below, the technologies described herein may be particularly useful for providing textual information relevant to an event to one or more client devices, e.g., which may be possessed by one or more attendees of the event and/or persons having an interest in the event. In particular, the technologies described may form all or a part of a public address system that may convert auditory information (e.g., in one or more public address announcements) to textual information, and which may transmit the textual information to one or more client devices in one or more messages. Therefore in some embodiments the technologies described herein may be understood as being configured to provide a closed captioning service for live events, wherein textual information correlating to auditory information (e.g., an announcement made at the event) is provided directly or indirectly from a server device to one or more client devices.

One aspect of the present disclosure therefore relates to systems for providing textual information. In this regard reference is made to FIG. 1, which depicts an example system for providing textual information consistent with the present disclosure. As shown, system 100 includes audio sensor 101, loudspeaker 102, server 103, client 104, and optional network 105. Without limitation, system 100 preferably includes and/or utilizes optional network 105.

Audio sensor 101 may be any suitable sensor for detecting an audio input and converting a detected audio input into an audio signal. Non-limiting examples of suitable devices which may be used as audio sensor 101 include acoustic to electric transducers such as microphones. Non limiting examples of suitable microphones that may be used as audio sensor 101 include electromagnetic induction microphones, ribbon microphones, condenser microphones, piezoelectric microphones, fiber optic microphones, any or all of which may be unidirectional, bidirectional, or cardioid. Without limitation, audio sensor 101 is preferably in the form of an array of microphones (hereafter referred to as an "array microphone." In some embodiments an array microphone is used as audio sensor 101 and is in the form of a plurality of microphones which may produce a multichannel audio signal which may be processed (e.g., by a beam forming network or other signal processing method) to generate a single channel enhanced audio signal, on which desired audio (e.g., voice activity) may be isolated and/or detected.

In operation audio sensor 101 may function to detect and convert an audio input (not shown) into an audio signal, also referred to herein as a first signal. The audio input may be produced by any suitable source, such as one or more humans (e.g., an announcer, presenter, event attendee, etc.), a loudspeaker, etc. Without limitation, the audio input preferably contains speech, either alone or in combination with other audio information (e.g., noise). Regardless, audio sensor 101 may convert a detected audio input to a first signal, which it may then transmit to one or more additional components of system 100. In some embodiments, audio sensor 101 may transmit a first signal to loudspeaker 102, with which it may be in wired or wireless communication. This concept is illustrated by the broken arrow connecting audio sensor 101 to loudspeaker 102. Additionally, audio sensor 101 may transmit the first signal to server 103 via wired and/or wireless communication, as shown by the broken arrow connecting audio sensor 101 with server 103. In instances where audio sensor 101 does not transmit the first signal to loudspeaker 102, server 103 may convey the first signal (or some signal processed form thereof) to loudspeaker 102.

Communication between audio sensor 101, loudspeaker 102 and server 103 may occur in any suitable manner. For example, audio sensor 101 may be in wired and/or wireless communication with one or both of loudspeaker 102 and server 103. Likewise, server 103 may be in wired and/or wireless communication with loudspeaker 102. Without limitation, audio sensor 103 is preferably in wireless communication with one or both of loudspeaker 102 and server 103. In such instances, audio sensor may transmit a first signal to server 103 and/or loudspeaker 102 via a short range communication network, a long range communication network, combinations thereof, and the like.

Loudspeaker 102 is or includes an electroacoustic transducer that produces sound in response to an audio signal such as the first signal noted above. In this regard, loudspeaker 102 may be any suitable type of loudspeaker known in the art, provided that it can convert the first signal to sound. As will be appreciated in the art, the sound produced by loudspeaker 102 in response to the first signal may be a reproduction of the audio input detected by audio sensor 101.

Server 103 may be one or more electronic devices, as defined above. In some embodiments, server 103 is or includes one or more cellular phones, desktop computers, electronic readers, laptop computers, set-top boxes, smart phones, tablet personal computers, televisions, or ultra-mobile personal computers, which may form all or a part of a public addressing system. Regardless and as will be described below, server 103 may generally function to convert audio information (e.g., speech) in a first signal received from audio sensor 101 to textual information. Server 103 may also prepare one or more messages containing at least a portion of the textual information and transmit such message(s) to client 104.

As will be described in detail later with respect to FIG. 2, server 103 may perform one or more functions in addition to those noted above. For example server 103 may execute one or more noise reduction operations on the first signal prior to converting the audio information (e.g., speech) therein to textual information. Alternatively or additionally, server 103 perform one or more policy enforcement operations, translation operations, and classification operations on the textual information produced by converting the first signal, and/or on message(s) in which such textual information is contained. Server 103 may also archive textual information and/or messages containing textual information.

In any case server 103 may communicate one or more messages containing textual information to client 104. Communication of such message(s) may occur in any suitable manner. For example, server 103 may transmit a message to client 104 via network 105, as illustrated in FIG. 1. Network 105 may be any network that carries data. Non-limiting examples of suitable networks that may be used as network 105 include short and long range communications networks as defined above, combinations thereof, and the like. In some embodiments, network 105 is a short range communications network such as a BLUETOOTH® network, a zig bee network, a near field communications (NFC) link, a wired (e.g., Ethernet) connection, combinations thereof, and the like. In other embodiments, network 105 is a long range communications network such as a Wi-Fi network, a cellular (e.g., 3G, 4G, etc.) network, a wide area network such as the Internet, combinations thereof and the like.

In some embodiments server 103 may communicate one or more messages to client 104 using a combination of networks, such as a combination of a cellular network and the internet, a cellular network and a Wi-Fi network, etc. In such instances, server 103 may transmit full or partial copies of one or more messages over each type of network in the combination. For example, server 103 may transmit a first copy of a message over a Wi-Fi network, and a second copy of the message over a cellular network. As will be described later, server 103 may be configured in some embodiments to transmit one or more messages to all client devices connected to network 105, e.g., to all addresses in instances where network 105 is a Wi-Fi network. In other embodiments, server 103 may be configured to transmit one or more messages to select client devices, e.g., those which have subscribed to receive messages from server 103, or which have otherwise authorized the receipt of such messages.

Like server 103, client 104 may be one or more electronic devices as defined above. In some embodiments, client 104 is or includes one or more cellular phones, desktop computers, electronic readers, laptop computers, set-top boxes, smart phones, tablet personal computers, televisions, or ultra-mobile personal computers. Regardless and as will be described below, client 104 may generally function to receive message from server 103 and to display such messages, e.g., on a screen thereof. Client 104 may also perform initial operations before and/or after receipt of a message. For example, client 104 may enforce one or more policies governing the display of messages received from server 103. For example client 104 may analyze a message received from server 103 against one or more policies, which may include one or more parameters that may be applied to determine whether or not client 104 will or will not display the received message. Regardless of whether a received message is displayed, client 104 may archive received messages, e.g., in a memory thereof.

Figure 2:
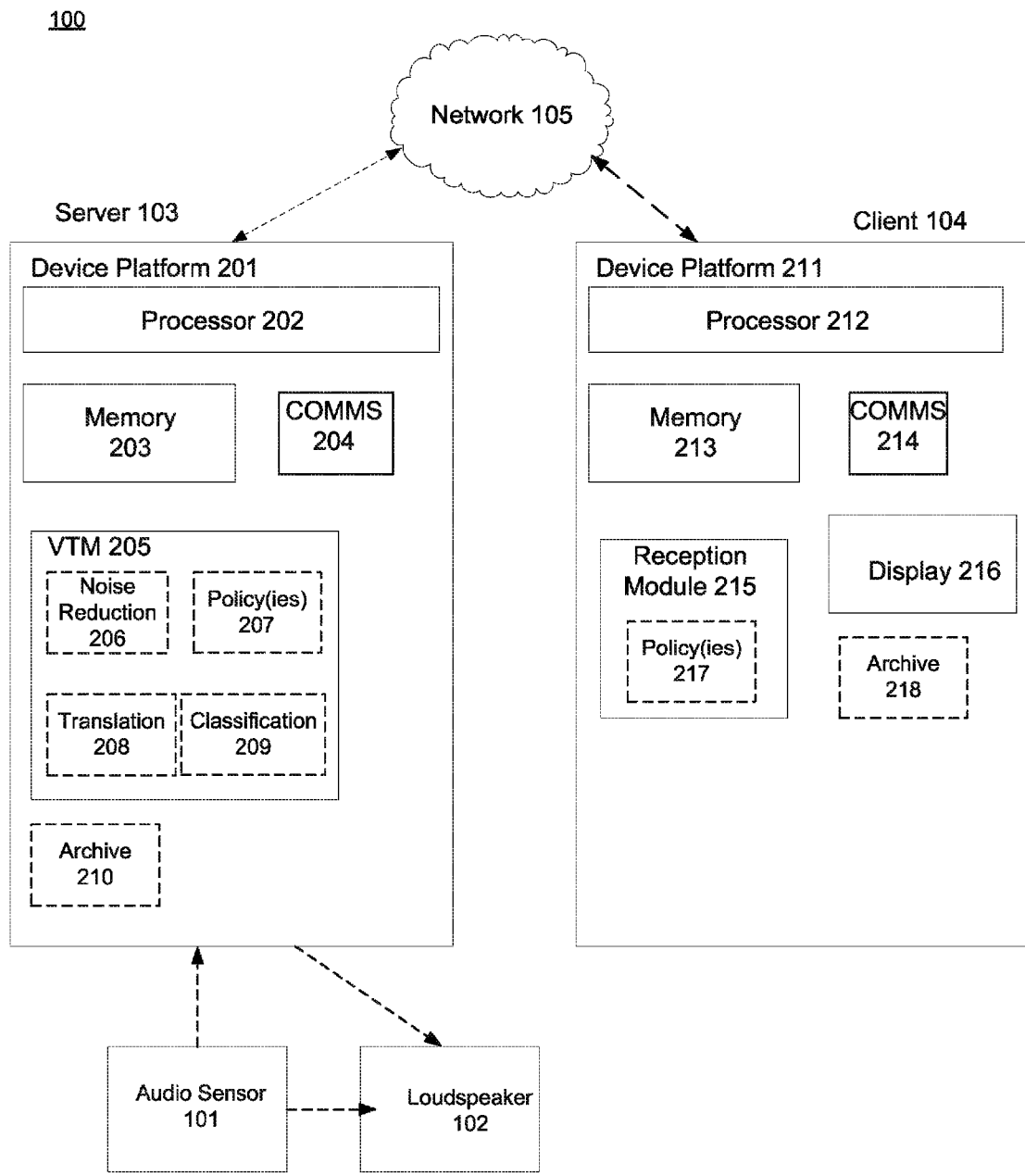
FIG. 2 is a block diagram showing more details of an example system for providing textual information consistent with the present disclosure.

Reference is now made to FIG. 2, which depicts a block diagram including more details of system 100 for providing textual information. As shown, server 103 includes device platform 201, which may be any suitable device platform. Without limitation it is preferred that device platform 201 correlate to the type of electronic device used as server 103. Thus for example where server 103 is a cellular phone, smart phone, desktop computer, laptop computer, etc., device platform 204 is preferably a cellular phone platform, smart phone platform, desktop computer platform, laptop computer platform, etc. respectively.

Regardless of its nature, device platform 201 may include processor 202, memory 203, and communications resources (COMMS) 204. Processor 202 may be any suitable general purpose processor or application specific integrated circuit, and may be capable of executing one or multiple threads on one or multiple processor cores. Without limitation, processor 202 is preferably a general purpose processor, such as but not limited to the general purpose processors commercially available from INTEL® Corp., ADVANCED MICRO DEVICES®, ARM®, NVIDIA®, APPLE®, and SAMSUNG®. While FIG. 2 illustrates server 103 as including a single processor, multiple processors may be used.

Memory 203 may be any suitable type of computer readable memory. Exemplary memory types that may be used as memory 203 include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memory 106 may include other and/or later-developed types of computer-readable memory.

COMMS 204 may include hardware (i.e., circuitry), software, or a combination of hardware and software that is configured to allow server 201 to at least transmit to and/or receive communications from at least audio sensor 101, loudspeaker 102, and client 104. Communication between COMMS 204 and audio sensor 101, loudspeaker 102 and/or client 104 may occur over a wired or wireless connection using a close and/or long range communications network as described generally above. COMMS 204 may therefore include hardware to support such communication, e.g., one or more transponders, antennas, BLUETOOTH™ chips, personal area network chips, near field communication chips, wired and/or wireless network interface circuitry, combinations thereof, and the like.

As noted above, audio sensor 101 may transmit audio information to server 103, e.g., in a first signal. In such instances, COMMS 204 may be configured to receive the first signal from audio sensor 101. COMMS 204 may also be configured to route the first signal and/or auditory information therein to appropriate components of server 103, and optionally to transmit the first signal and/or auditory information therein to loudspeaker 102, as generally described above. Moreover, COMMS 204 may be configured to transmit one or more messages containing textual information derived from the auditory information in the first signal to client 104, e.g., via a short and/or long range communications network as mentioned above.

As further shown in FIG. 2, server 103 may include voice to text module (VTM) 205. For the sake of illustration, VTM 205 is illustrated as a separate component of device platform 201, as in some embodiments it may be present as logic implemented at least in part on hardware to perform various voice to text functions consistent with the present disclosure. Of course this illustration is an example only, and it should be understood that VTM 205 may be provided on device platform 201 in some other fashion. For example, VTM 205 may be in the form of or include computer readable instructions that are stored on device platform 201 (e.g., in memory 203), and which cause server 104 to perform voice to text functions and optionally other functions consistent with the present disclosure as described below.

In general VTM 205 may be configured to cause the performance of voice to text operations on auditory information received from audio sensor 101, e.g., in a first signal. In this regard, VTM 205 may include hardware, software, or a combination of hardware and software which may be configured to convert auditory information in the first signal to textual information. VTM 205 may employ any suitable method and/or mechanism to convert auditory information in the first signal to speech. For example, VTM 205 may employ one or more speech recognition methods and/or algorithms, which may be implemented in hardware, software or a combination thereof to detect auditory information in a first signal (e.g., speech) and to convert detected auditory information to speech.

As noted above, VTM 205 may perform speech recognition operations on auditory information a first signal received from audio sensor 101, so as to convert auditory information in the first signal to textual information. To improve accuracy or for another purpose, VTM 205 may utilize and/or rely on one or more context specific libraries (not shown, hereinafter, "language libraries"), which may be stored in memory 203, on another part of device platform 201, or at some other location (e.g., on a remote system). Regardless of where they are stored, the language libraries may include a plurality of terms that may be specific to or more frequently used in particular contexts, such as but not limited to a particular event at which the technologies described herein may be used.

For example in instances where server 103 is applied to perform voice to text operations at a sporting event, VTM 201 may leverage or otherwise rely on a language library that includes terms which may be commonly used by announcers at the sporting event. Of course this is merely one example, and server 103 may be applied in other contexts and optionally with other language libraries. For example, server 103 may be applied to perform voice to text operations in at concerts (or other musical event), corporate meetings, political rallies, speeches, etc., in which case VTM 205 may or may not leverage a language library including terms that may be commonly used at each respective type of event.

Server 103 may optionally include noise reduction module 206. When used, noise reduction module 206 may generally function to process a first signal received from audio sensor 101 in an attempt to reduce unwanted noise and/or to isolate desired noise (e.g., speech) therein. That is, noise reduction module 206 may function to improve the ratio of the strength of desired auditory information (signal) to unwanted auditory information (noise) in a first signal received from audio sensor 101. More generally, first signals received from audio sensor 101 may include a first level of unwanted noise, relative to a level of signal (e.g., speech). Through the application of noise reduction or other signal processing techniques, noise reduction module may reduce the first level of noise to a second level of noise, such that the signal to noise ratio of the signal is improved.

Noise reduction module 206 may employ any suitable method and/or mechanism to reduce noise and/or improve signal to noise ratio. For example, noise reduction module 206 may employ one or more noise reduction methods and/or algorithms, which may be implemented in hardware, software or a combination thereof to reduce noise in a received audio signal, and/or to improve the ratio of signal (e.g., auditory information such as speech) to noise in a received audio signal.

For the sake of illustration, noise reduction module 206 is illustrated in FIG. 2 as part of voice to text module 205. It should be understood that such illustration is for the sake of example only, and that noise reduction module 206 may be provided in any suitable manner. For example and as illustrated in FIG. 2, noise reduction module may be in the form of a module that includes hardware, software or a combination of hardware and software that is embedded in or otherwise forms part of VTM 205. Alternatively or additionally, noise reduction module 206 may be provided as a module that is separate from VTM 205, in which case it may be an independent module on device platform 201. In some embodiments, noise reduction module 206 may include or be in the form of computer readable noise reduction instructions stored on device platform 201 (e.g., in memory 203). In such instances the noise reduction instructions when executed by processor 202 may cause device platform 201 to perform noise reduction operations consistent with the present disclosure. That is, execution of such instructions may cause device platform 201 to process first signals received from audio sensor 101 to reduce noise and/or to improve the signal to noise ratio thereof, e.g., so as to facilitate the performance and/or accuracy of the speech to text operations described herein.

VTM 205 may also function to incorporate textual information derived from auditory information in first signals received from audio sensor 101 into one or more messages, also referred to herein as text messages. The nature and format of the text messages are not limited, and any suitable text message format may be used. In some embodiments, VTM 205 may produce or may cause the production of text messages that comply with one or more wired or wireless transmission protocols.

For example, VTM 205 may incorporate textual information into one or more text messages complying with one or more electronic messaging protocols that may be in force before or after the filing date of this disclosure, such as but not limited to one or more electronic mail, short message service (SMS), enhanced message service (EMS), and multimedia messaging service (MMS) protocols. As may be appreciated, such text messages may be particularly suited to transmission over cellular networks, such as but not limited to a 3G or 4G network.

Alternatively or additionally, VTM 205 may produce or cause the production of text messages that are suitable for transmission over a wired or wireless Wi-Fi and/or internet connection. In this regard, text messages produced by VTM 205 may be packaged or otherwise included in one or more packets, which may be transmitted from server 103 to client 104, e.g., in accordance with the transmission control protocol/internet protocol (TCP/IP). In some embodiments, the text messages and/or textual information therein may be organized in accordance with one or more higher level protocols, such as one or more instant messaging protocols. More generally, VTM 205 may cause server 103 to produce text messages and to send one or more signals (hereinafter, second signals) containing such text messages to client 104, e.g., via network 105.

Although the present disclosure envisions embodiments wherein VTM 205 causes a server to package textual information into discrete text messages, the use of discrete text messages is not required. Indeed the present disclosure envisions and encompasses embodiments wherein textual information is transmitted from a server to a client in any suitable manner. For example, VTM 205 may cause a server to transmit a continuous stream of textual information to one or more clients, e.g., via an open and/or active communications link between such devices.

Device platform 201 may further include an optional policy enforcement module (not shown), which may form part of VTM 205 or may be separately provisioned on server 103. Regardless of its nature, the policy enforcement module may include hardware, software, or a combination of hardware and software which may be configured to perform policy enforcement operations consistent with the present disclosure. In some embodiments the policy enforcement module may be implemented at least in part in hardware to perform server side policy enforcement operations consistent with the present disclosure. These policy enforcement operations may be dictated by one or more optional policy (ies) 207 stored on device platform 201, as shown in FIG. 2. It should be noted that while policy(ies) 207 are illustrated in FIG. 2 as being stored in VTM 205, such policy(ies) may be provisioned in any suitable manner. For example, optional policy(ies) 207 may be stored in memory 203 of device platform 201, or at some other suitable location.

In some embodiments policy(ies) 207 may be a database or other data structure which associates one or a combination of operations with one or more text message factors. Non-limiting examples of text message factors include categorical factors such as the type of text message, the context giving rise to the text message (e.g., the type of event at which server 103 is being employed), the identity of the entity generating the auditory information from which the text message was derived (e.g., the identity of an announcer), combinations thereof, and the like. Further non-limiting examples of text message factors include compartmentalization factors such as the nature of the information contained in the text message (e.g., a score, an emergency announcement, an injury report, etc.), an importance rating (significance) associated with the text message (e.g., emergency, general, routine, unimportant, etc.), combinations thereof, and the like. For example, in instances where the technologies describe herein are used at a sporting event, policy(ies) may include a categorization corresponding to the identity of the sporting event (e.g., Hockey), and a plurality of compartmentalization factors correlating to events at the sporting event which may be announced (e.g., injury, score, penalty, timeout, advertising announcement, etc.).

The categorizations and/or compartmentalization factors in policy(ies) 207 may be correlated with one or more operations. For example, policy(ies) 207 may specify the transmission of messages to client 104 when an event corresponding to a particular category and compartmentalization are detected, e.g., by the analysis of text messages produced by VTM 205, e.g., by a policy enforcement module. Alternatively or additionally policy(ies) 207 may specify the manner in which text messages produced by VTM 205 are to be transmitted, e.g., via network 105. For example, policy(ies) 207 may specify that messages produced in connection with a particular event are to be transmitted via short range communication, long range communication, or a combination thereof. Without limitation, policies(ies) 207 preferably specify that text messages produced by VTM 205 are to be transmitted via a cellular phone network, a Wi-Fi network, or a combination thereof. It may therefore be understood that the policy enforcement module on device platform 201 may enforce the parameters of policies 207 so as to cause VTM 205 to produce and/or send text messages in a manner that is consistent with the operations correlated to those parameters.

As may be appreciated, the technologies of the present disclosure may be used to broadcast text messages to large numbers of clients 104. Indeed at large sporting events such as a football game, auto race, or other professional sport, it is conceivable that the number of clients 104 receiving text messages may range from about 1 to about 200,000 or more. As a result, a significant amount of processing and bandwidth may be needed to address and transmit text messages from server 103 to client 104. It may therefore be desirable to control the manner in which text messages are transmitted from server 103 to client 104, e.g., via policy(ies) 207 and a policy enforcement module.

By way of example, policy(ies) 207 may specify that text messages produced in connection with a specified event may be transmitted through preselected communications channels and/or via pre-selected forms of wired or wireless communication. In some instances for example, policy(ies) 207 may specify the production of text messages that are compatible with a Wi-Fi communication protocol, and which may be broadcast to all address on a Wi-Fi network (e.g., network 105) to which server 103 and client(s) 104 are connected. As may be appreciated, this may avoid the need to individually address text messages to each client 104 that wishes to receive them and which is connected to network 105). Rather because such messages would be transmitted to all addresses on the Wi-Fi network, any client device connected to net-work 105 would receive such messages without expending the overhead needed to individually address each message, e.g., as may be needed in instances where such messages are to be transmitted over a cellular phone network.

Of course the technologies described herein are not limited to embodiments wherein text messages are transmitted over a Wi-Fi network. Indeed in some instances server 103 may be used to transmit messages to client devices that are not connected to a Wi-Fi network. For example, an individual in possession of a client 104 may be located remotely from an event, but may still be interested in receiving text messages generated by VTM 205. In such instances, policy (ies) 207 may specify the transmission of text messages to such client(s) via another form of communication, such as a cellular phone network. In such instances, policy enforcement module may cause device platform to address and transmit text messages to such clients in an appropriate manner.

In still further embodiments, policy(ies) 207 may specify the transmission of text messages via multiple communication modes, such as via a WI-FI network and a cellular phone network. Although potentially imposing more overhead on device platform 201, transmission of text messages in this manner may allow more client devices to receive such messages, as compared to the transmission of such messages via the cellular network or the Wi-Fi network alone.

Policy(ies) 207 may further specify a subscriber base to which text messages produced by VTM 205 are to be transmitted. As noted previously, server 103 may broadly transmit text messages to a large number of client devices, including any client device that may be connected to a Wi-Fi network with which server 103 is also in communication. Although this may permit effective transmission of text messages to a large number of clients, selective transmission of text messages may be desired. Accordingly, policy(ies) 207 may specify transmission of text messages to particular client devices and/or groups of client devices. For example, policy(ies) 207 may specify that text messages (e.g., of a particular category and/or compartmentalization) are to be transmitted to client devices that have registered with server 103 to receive such messages.

Registration of client devices 104 with server 103 may be performed in any suitable manner. For example, server 103 may register a client 104 in response to receipt of a message from client 104 containing a subscription token or other electronic request. As will be described later in connection with client 104, the subscription token or other electronic request may be obtained by client 104 through a variety of mechanisms, such as via communication with server 103, by imaging or otherwise scanning a quick response (QR) or other bar code, by decoding or otherwise obtaining the token or other electronic request from an auditory communication (e.g., from metadata or other data embedded in an audio track such as song), combinations thereof, and the like. Accordingly, policy(ies) 207 and/or VTM 205 may in some embodiments include instructions which when executed cause server 103 to produce a token or other electronic request in one or more of the above mentioned forms, and to convey that token or other electronic request to client 104.

Device platform 201 may further include optional translation module 208, as generally shown in FIG. 2. In general, translation module 208 may include hardware, software, or a combination of hardware and software which is configured to cause server 103 to perform translation operations consistent with the present disclosure. For example, translation module 208 may be in the form of computer readable translation instructions which when executed by processor 202 cause server 103 to perform translation operations consistent with the present disclosure.

For example, VTM 205 may produce first textual information from auditory information in received first signals from audio sensor 101. In such instances translation module 208 may cause server 103 to translate the first textual information into second textual information, and to produce text messages containing the second textual information. In some embodiments the first textual information produced by VTM 205 may be in a first language and the second textual information may be at least one second language that is different from the first language. For example the first language may be English, Spanish, French, etc., and the at least one second language may be French, Spanish, English, sign language, etc. In any case, translation module 208 may cause VTM 205 to produce text messages containing textual information in the at least one second language. Server 103 may then transmit one or more second signals including text messages containing textual information in the at least one second language to one or more clients 104.

Device platform may further include optional classification module 209. Classification module 209 may therefore be in the form of hardware, software, or a combination or hardware and software that causes the performance of classification operations consistent with the present disclosure. While classification module 209 is illustrated in FIG. 2 as part of VTM 205, it should be understood that such illustration is for the sake of example only and the classification module 209 may be provisioned in any suitable manner on device platform 201.

In any case classification module 209 may generally function to cause the performance of classification operations on text messages produced by VTM 205. In particular, classification module 209 may cause server 103 to inspect the content of text messages generated by VTM 205, and to assign a classification to such text messages. The classification may correlate to one or more of the category and compartmentalization factors described above in connection with policy(ies) 207. Moreover, classification module 209 may cause VTM 205 (or, more generally, server 103) to associate the classification with one or more text messages. For example, classification module 209 may cause VTM 205 to incorporate an assigned classification into metadata describing the text message with which the classification is associated. The metadata may then be transmitted (e.g., in a second or other signal) with the text message to client 104. Alternatively or additionally, an assigned classification may be transmitted separately to client 104 in one or more messages that identify the text message with which the assigned classification is associated. As will be described later, client 104 may utilize the classification information to determine whether or not to display a received text message, e.g., on display 216.

Device platform 201 may further include optional archive 210, as shown in FIG. 2. For the sake of illustration archive 210 is shown in FIG. 2 as a separate component of device platform 201. It should be understood that this illustration is for the sake of example and that archive 210 may be provisioned in any suitable manner. For example archive 210 may be stored on memory 203 or within another memory of device platform 201. In any case optional archive 210 may be in the form of a database or other data structure which may store text messages produced by VTM 205. Text messages stored within archive 210 may then be available for recollection and transmission, e.g., in response to a request from client 104.

By way of example audio sensor 101 may transmit a plurality of first signals to server 103, wherein the first signals containing auditory information including speech produced by an announcer over the course of an event. VTM 205 may process the first signals to convert the auditory information therein to textual information, and to prepare and send text messages containing the textual information to client 104. VTM 205 may (e.g., pursuant to operations specified in optional policy(ies) 207) also store such text messages in archive 210.

Over the course of the event, client 104 may receive text messages from server 103, and display the textual information therein on a display thereof, as will be described later. During or after the event, a user of client 104 may wish to recall a text message that was received in connection with a particular point in the event. To do so, client 104 may (if it does not include its own archive) send a request message to server 103, e.g., via network 105. The request message may request retransmission of text messages sent by server 103, e.g., over a particular time period or by some other identifier. In response to the request message, VTM 205 may cause server 103 to query archive 210 for the request text messages and, if such messages are stored in archive 210, to retransmit the requested text messages to client 104.

As further shown in FIG. 2, client 104 may include device platform 211, which may be any suitable device platform such as those noted above for device platform 201. Without limitation it is preferred that device platform 211 correlate to the type of electronic device used as client 104. Thus for example where client 104 is a cellular phone, smart phone, desktop computer, laptop computer, etc., device platform 211 is preferably a cellular phone platform, smart phone platform, desktop computer platform, laptop computer platform, etc. respectively. Without limitation device platform 211 is preferably a smart phone platform.

Regardless of its nature, device platform 211 may include processor 202, memory 203, and communications resources (COMMS) 204. The nature and function of these components is the same as processor 202, memory 203, and COMMS 204, and for the sake of brevity is not reiterated. In addition, device platform 211 may include reception module 215, display 216, optional policy(ies) 217 (which may be enforced by a client policy enforcement module (not shown)), and optional archive 218.

Reception module 215 may be in the form of hardware, software, or a combination of hardware and software which is configured to cause client 104 to perform text message reception operations consistent with the present disclosure. In some embodiments, reception module 215 may be in the form of computer readable instructions (e.g. stored on memory 213) which when executed by processor 212 cause the performance of text message reception operations consistent with the present disclosure.

As noted above, server 103 may transmit text messages to client 104 via network 105, e.g., in one or more second signals. With this in mind, reception module 215 may cause the performance of a variety of operations in response to receipt of a second signal. In particular, reception module 215 may cause client 104 to process the second signal to obtain the text message(s) contained therein, and to display the textual information in such text messages on display 216.

Although the present disclosure envisions embodiments in which reception module 215 causes client 104 to display all text messages received from server 103, in some embodiments it may be desirable to limit or control which text messages are displayed. In this regard, client 104 may include a client policy enforcement module (not shown) which may enforce pone or more optional policy(ies) 217, which may be provisioned within reception module 215, memory 213, or at another location on device platform 211. In this regard, optional policy(ies) 217 may be in the form of a database or other data structure in which one or more display control parameters are correlated with one or more attributes of text messages that may be received from server 103. Non-limiting examples of attributes of such text messages that may be included in policy(ies) 217 include keywords in a received text message, a classification assigned to a text message (e.g., by classification module 209), a user preference (i.e. importance) indicator, a type indicator (e.g., commercial vs. non-commercial) combinations thereof, and the like. Such attributes (or combinations thereof) may be correlated with a (positive or negative) display value that dictates whether or not text messages containing such attribute will be displayed.

In some embodiments, attributes of text messages in policy(ies) 217 may be associated with a display score, signifying the relative importance of the attribute in determining whether or not a text message is to be display. The scores may be pre-assigned and/or may be configurable, e.g., by a user. In such embodiments, the client policy enforcement module may cause client 104 to inspect text messages and/or classification information associated with text messages received from server 104 to determine the presence of attributes specified in policy(ies) 217. The sum of the scores assigned to detected attributes may then be compared to a threshold display value, which may be pre-determined and/or configurable by a user. If the sum of the scores assigned to detected attributes meet or exceed the threshold, reception module 215 may cause client 104 to display the content of the text message on display 216. If the sum of the scores assigned to detected attributes does not meet or exceed the threshold however, reception module 215 may prevent client 104 from displaying the content of the text message on display 216.

Display 216 may be any display that is suitable for use with device platform 211. Without limitation, display 216 is a display correlating to the type of device platform used as device platform 211. Therefore in instances where device platform 211 is a cellular phone platform, smart phone platform, desktop computer platform, laptop computer platform, etc., display 216 is preferably in the form of a cellular phone display, smart phone display, desktop computer display (e.g., computer monitor), a laptop computer display, etc.

Device platform 211 may also include optional archive 218, as shown in FIG. 2. Similar to archive 210, optional archive 218 may serve as a repository for text messages received by client 104 from server 103. In this regard, archive 218 may in some embodiments be in the form of a database or other data structure (e.g., stored in memory 213), within which text messages received from server 103 may be stored.

With this in mid, reception module 215 may be further configured to cause the performance of text retrieval operations consistent with the present disclosure, e.g., in response to a request for re-display of a received text message. Such a request may be received or produced in response to a user input (e.g., through a user interface (not shown) of client 104). The request may request re-display of text messages received from server 130, e.g., by a particular reception time, another identifier, or some combination thereof.

In any case, in response to such a request reception module 215 may cause client 104 to query archive 218 for the request text messages and, if such messages are stored in archive 218, to display the requested text messages on display 216.

Figure 3:
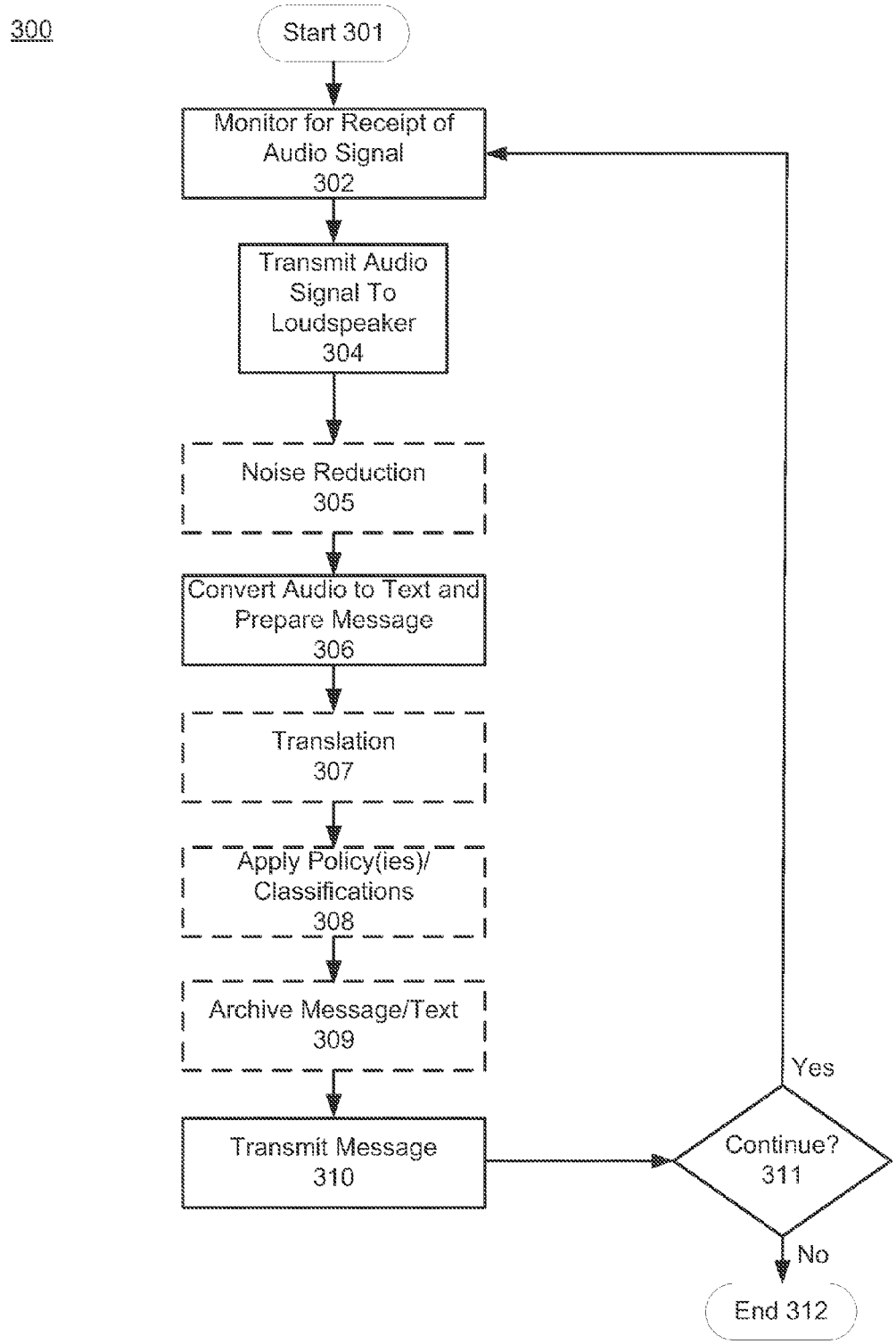
FIG. 3 is a flow chart of example operations consistent with an example method of providing textual information consistent with the present disclosure.

Another aspect of the present disclosure relates to methods of providing textual information. In this regard reference is made to FIG. 3, which is a flowchart of example operations of one example method of providing textual information consistent with the present disclosure. As shown, method 300 begins at block 301. The method may then proceed to block 302, wherein a server consistent with the present disclosure may monitor for the receipt of an audio (first) signal, e.g., from an audio sensor as described above.

The method may then proceed to block 304 wherein audio information may be transmitted in an audio signal to a loudspeaker, e.g., in communication with the server as described above. The method may proceed to optional block 305, wherein one or more noise reduction operations may be performed on the received audio signal as generally described above.

Once the noise reduction operations of block 305 are complete (or if noise reduction was omitted), the method may proceed to block 306, wherein the auditory information in the audio signal may be converted to text, e.g., using a voice to text module. As described above the resulting textual information may then be packaged into one or more text messages for transmission to a client.

The method may then proceed to optional block 307, wherein one or more translation operations may be performed on the textual information contained in the text message(s) produced in accordance with block 306. Pursuant to this block, one or more translation operations may be applied to convert the (first) textual information in the text messages into second textual information, as generally described above.

Once translation is complete or if it is omitted, the method may proceed to optional block 308 wherein a policy or multiple policies may be applied to the text message(s) as described above. For example, a policy enforcement module may apply one or more policies to determine which clients will are to receive the text message, the manner in which the text message is to be transmitted, whether the text message is to be archived, etc. In addition, pursuant to this block one or more classifications may be applied to a text message, consistent with the foregoing disclosure. Such classifications may be associated with the text message, e.g. in metadata describing the text message and/or in one or more messages that identify the text message with which a classification is associated.

After the application of policy(ies) and/or classifications (or if such operations are omitted), the method may then proceed to optional block 309, wherein the text message may be archived as generally described above. The method may then proceed to block 310, wherein the text message may be transmitted to a client in one or more second signals, e.g., over a short and/or long range communications network.

The method may then proceed to block 311, wherein a determination may be made as to whether the method is to continue. In instances where additional text messages are to be sent, the method may loop back to block 302 and repeat. If a text message is a last text message (e.g., in a particular group or for an event in total), the method may proceed to block 312 and end.

Figure 4:
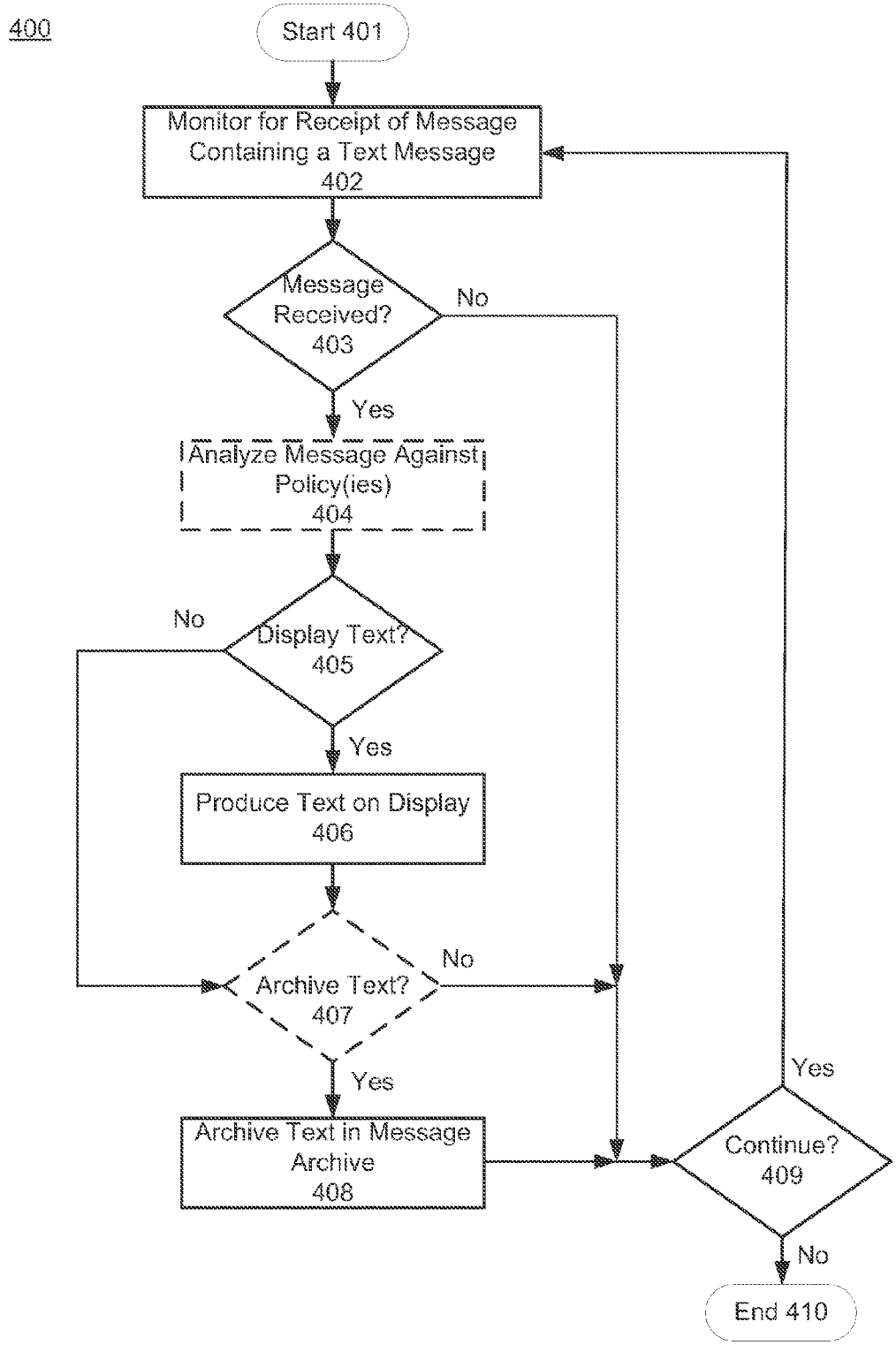
FIG. 4 is a flow chart of example operations consistent with an example method of receiving textual information consistent with the present disclosure.

Another aspect of the present disclosure relates to methods of receiving text messages. Reference is therefore made to FIG. 4, which is a flow chart of example operations that may be performed in a method of receiving text messages consistent with the present disclosure. As shown, method 400 begins at block 401. At block 402, a client consistent with the present disclosure may monitor for receipt a (second) signal from a server containing a text message.

The method may then proceed to block 403, wherein a determination may be made as to whether a text message was received. If not, the method may proceed to block 409, wherein a determination may be made as to whether the method is to continue. If so the method may return to block 402. If not, the method may proceed to block 410 and end.

Once a signal containing a text message has been received, the method may proceed to optional block 404. Pursuant to this block a client may, in response to receiving the signal, analyze the text message and/or classification information associated therewith against one or more policy (ies), e.g., using the client policy enforcement module described previously.

Once the analysis pursuant to block 404 is complete or if such analysis is omitted the method may proceed to block 405, wherein a determination may be made as to whether the received text message is to be displayed. If so, the method may proceed to block 406, wherein the text message may be displayed on a display of the client device. At this point (or if a determination is made in block 405 not to display the text message) the method may proceed to optional block 407, wherein a determination may be made as to whether the text message is to be archived. If so, the method may proceed to block 408, wherein the text message may be archived in an archive of the client device, as generally described above.

Once the message is archived or if archiving is omitted, the method may proceed to block 409, wherein a determination may be made as to whether the method is to continue. If so the method may return to block 402. If not, the method may proceed to block 410 and end.

EXAMPLES

The following examples pertain to further embodiments. The following examples of the present disclosure may comprise subject material such as a system, a device, a method, a computer readable storage medium storing instructions that when executed cause a machine to perform acts based on the method, and/or means for performing acts based on the method, as provided below.

Example 1

One example of the technology of the present disclosure is a system for providing textual information, including: an audio sensor in communication with a loudspeaker and a voice to text server, the audio sensor configured to detect auditory information and transmit a first audio signal containing the auditory information to the loudspeaker and the voice to text server; wherein the voice to text server includes a processor, communications circuitry, memory, and a voice to text module including logic implemented at least in part in hardware to cause the voice to text server to perform the following operations including, in response to receiving the first signal: convert the audio information to textual information; prepare a message containing at least a portion of the textual information; and transmit a second signal containing the message with the communications circuitry to a mobile computing device.

Example 2

This example includes any or all of the features of example 1 wherein: the first signal further includes a first level of noise; the system further includes a noise reduction module including logic implemented at least in part in hardware to cause the voice to text server to reduce the first level of noise to a second level of noise prior to converting the audio information to textual information.

Example 3

This example includes any or all of the features of examples 1 and 2, wherein the communications circuitry includes at least one of a wired network interface, a wireless network interface, and a cellular network interface.

Example 4

This example includes any or all of the features of any one of examples 1 to 3, the message is an electronic mail message, a short message service message, a Wi-Fi network message, or a combination thereof.

Example 5

This example includes any or all of the features of any one of examples 1 to 4, wherein the voice to text module is further to cause the voice to text server to transmit the message over at least one of a WiFi network and a cellular network.

Example 6

This example includes any or all of the features of any one of examples 1 to 5, wherein: the textual information is first textual information; and the voice to text module further includes a translation module including logic implemented at least in part in hardware to cause the voice to text server to translate the first textual information into second textual information, the second textual information being different than the first textual information.

Example 7

This example includes any or all of the features of example 6 wherein the first textual information is in a first language, and the second textual information is in a second language.

Example 8

This example includes any or all of the features of any one of examples 1 to 7, wherein: wherein the voice to text module further includes a classification module including logic implemented at least in part in hardware to cause the voice to text server to classify the textual information in the message so as to provide a message description, and to transmit the message description in the second signal.

Example 9

This example includes any or all of the features of example 8, wherein the voice to text module is further to cause the voice to text system to include the message description as metadata within or associated with the message.

Example 10

This example includes any or all of the features of any one of examples 1 to 9, further including a message archive stored in the memory, wherein the voice to text module is further to cause the voice to text system to record a copy of at least one of the textual information and the message in the message archive.

Example 11

This example includes any or all of the features of any one of examples 1 to 10, wherein the audio sensor includes a microphone that is in communication with the voice to text server.

Example 12

This example includes any or all of the features of any one of examples 1 to 11, wherein the microphone includes an array microphone.

Example 13

This example includes any or all of the features of any one of examples 1 to 12, wherein the mobile computing device is selected from the group consisting of a cellular phone, electronic reader, laptop computer, smart phone, tablet personal computer, portable television, ultra-mobile personal computer, or a combination thereof.

Example 14

This example includes any or all of the features of any one of examples 1 to 13, wherein the second signal is configured to cause the mobile computing device to display the textual information.

Example 15

This example includes any or all of the features of any one of examples 1 to 14, wherein the second signal is configured to cause the mobile computing device to determine whether or not to display the textual information.

Example 16

This example includes any or all of the features of example 15, wherein the message includes metadata describing the textual information, and the second signal is configured to cause the mobile computing device to determine whether or not to display the textual information based at least in part on the metadata.

Example 17

This example includes any or all of the features of any one of examples 1 to 16, wherein the voice to text server further includes: at least one policy stored in the memory, the policy correlating at least one operation with at least one text message factor associated with the message; and a policy enforcement module including logic implemented at least in part in hardware to cause the voice to text module to perform the at least one operation produce the message in accordance with the at least one operation correlated to the at least one text message factor.

Example 18

This example includes any or all of the features of example 17, wherein: the at least one text message factor is selected from categorization factors, compartmentalization factors, and combinations thereof; the categorization factors are selected from the group consisting of a type of the message, a type of event at which the voice to text server is being employed, an identity of an entity generating the auditory information, and combinations thereof; the compartmentalization factors are selected from the group consisting of the nature of information contained in the message, an importance rating, and combinations thereof.

Example 19

This example includes any or all of the features of any one of examples 17 and 18, wherein the at least one operation includes transmitting the second signal containing the message when at least one pre-determined text message factors is detected by the policy enforcement module.

Example 20

This example includes any or all of the features of any one of examples 17 and 18, wherein the at least one operation includes transmitting the second signal via a predetermined form of wired or wireless communication.

Example 21

This example includes any or all of the features of any one of examples 17 and 18, wherein the predetermined form of wired or wireless communication is selected from the group consisting of a cellular phone network, a WiFi network, or a combination thereof.

Example 22

This example includes any or all of the features of any one of examples 17 and 18, wherein the at least one operation includes transmitting the second signal to a predetermined subscriber base.

Example 23

According to this example there is provided a method for providing textual information, including: detecting auditory information with an audio sensor; transmitting a first signal containing the auditory information to a loudspeaker and a voice to text server; converting the audio information to textual information with the voice to text server; preparing a message containing at least a portion of the textual information with the voice to text server; and transmitting a second signal containing the message from the voice to text server to a mobile computing device.

Example 24

This example includes any or all of the features of example 23, wherein the first signal further includes a first level of noise, and the method further includes reducing the first level of noise to a second level of noise prior to converting the audio information to textual information.

Example 25

This example includes any or all of the features of any one of examples 23 and 24, wherein the message is a short message service message, a WiFi network message, or a combination thereof.

Example 26

This example includes any or all of the features of any one of examples 23 to 26, wherein the second signal is transmitted to the mobile computing device over at least one of a WiFi network and a cellular network.

Example 27

This example includes any or all of the features of any one of examples 23 to 26, wherein the textual information is first textual information and the method further includes translating the first textual information into second textual information, the second textual information being different than the first textual information.

Example 28

This example includes any or all of the features of example 27, wherein the first textual information is in a first language, and the second textual information is in a second language.

Example 29

This example includes any or all of the features of any one of examples 23 to 28, further including classifying the textual information in the message to provide a message description, and transmitting the message description in the second signal.

Example 30

This example includes any or all of the features of any one of examples 23 to 29, wherein preparing the message includes including the message description as metadata associated with the message.

Example 31

This example includes any or all of the features of any one of examples 23 to 30, and further includes recording a copy of at least one of the textual information and the message in a message archive.

Example 32

This example includes any or all of the features of any one of examples 23 to 31, wherein the audio sensor includes a microphone.

Example 33

This example includes any or all of the features of example 32, wherein the microphone includes an array microphone.

Example 34

This example includes any or all of the features of any one of examples 23 to 33, wherein the mobile computing device is selected from the group consisting of a cellular phone, electronic reader, laptop computer, smart phone, tablet personal computer, portable television, ultra-mobile personal computer, or a combination thereof.

Example 35

This example includes any or all of the features of any one of examples 23 to 34, and further includes: detecting at least one text message factor associated with the message; correlating at least one operation with the at least one text message factor; and performing at least one of the preparing the message and the transmitting the second signal in accordance with the at least one operation.

Example 36

This example includes any or all of the features of example 35, wherein the at least one text message factor is selected from categorization factors, compartmentalization factors, and combinations thereof; the categorization factors are selected from the group consisting of a type of the message, a type of event at which the voice to text server is being employed, an identity of an entity generating the auditory information, and combinations thereof; the compartmentalization factors are selected from the group consisting of the nature of information contained in the message, an importance rating, and combinations thereof.

Example 37

This example includes any or all of the features of any one of examples 35 and 36, wherein the at least one operation includes transmitting the second signal containing the message when at least one pre-determined text message factors is detected.

Example 38

This example includes any or all of the features of any one of examples 35 and 36, wherein the at least one operation includes transmitting the second signal via a predetermined form of wired communication.

Example 39

This example includes any or all of the features of any one of examples 35 and 36, wherein the at least one operation includes transmitting the second signal via a predetermined form of wireless communication.

Example 40

This example includes any or all of the features of any one of examples 35 and 36, wherein the predetermined form of wired or wireless communication is selected from the group consisting of a cellular phone network, a WiFi network, or a combination thereof.

Example 41

This example includes any or all of the features of any one of examples 35 and 36, wherein the at least one operation includes transmitting the second signal to a predetermined subscriber base.

Example 42

According to this example there is provided at least one computer readable medium having computer readable instructions stored thereon, wherein the instructions when executed by a processor cause the performance of the following operations including, in response to receipt of a first signal containing audio information from an audio sensor: transmitting the audio information to at least one loudspeaker; converting the audio information to textual information; preparing a message containing at least a portion of the textual information; and transmitting a second signal containing the message to a mobile computing device Example 43

This example includes any or all of the features of example 42, wherein the first signal further includes a first level of noise, and the instructions when executed by the processor cause the performance of the following additional operations including: reducing the first level of noise to a second level of noise prior to converting the audio information to textual information.

Example 44

This example includes any or all of the features of any one of examples 42 and 43, wherein the message is a short message service message, a WiFi network message, or a combination thereof.

Example 45

This example includes any or all of the features of any one of examples 42 to 44, wherein the second signal is transmitted to the mobile computing device over at least one of a WiFi network and a cellular network.

Example 46

This example includes any or all of the features of any one of examples 42 to 45, wherein the textual information is first textual information and the instructions when executed by the processor cause the performance of the following additional operations including: translating the first textual information into second textual information, the second textual information being different than the first textual information.

Example 47

This example includes any or all of the features of example 46, wherein the first textual information is in a first language, and the second textual information is in a second language.

Example 48

This example includes any or all of the features of any one of examples 42 to 47, wherein the instructions when executed by the processor cause the performance of the following additional operations including: classifying the textual information to provide a message description; and transmitting the message description in the second signal.

Example 49

This example includes any or all of the features of example 48, wherein preparing the message includes including the message description as metadata associated with the message.

Example 50

This example includes any or all of the features of any one of examples 42 to 49, wherein the instructions when executed by the processor cause the performance of the following additional operations including: recording a copy of at least one of the textual information and the message in a message archive.

Example 51

This example includes any or all of the features of any one of examples 42 to 50, wherein the audio sensor includes a microphone.

Example 52

This example includes any or all of the features of example 51, wherein the microphone includes an array microphone.

Example 53

This example includes any or all of the features of any one of examples 42 to 52, wherein the mobile computing device is selected from the group consisting of a cellular phone, electronic reader, laptop computer, smart phone, tablet personal computer, portable television, ultra-mobile personal computer, or a combination thereof.

Example 54

This example includes any or all of the features of any one of examples 42 to 53, wherein the instructions when executed by the processor cause the performance of the following additional operations including: detecting at least one text message factor associated with the message; correlating at least one operation with the at least one text message factor; and performing at least one of the preparing the message and the transmitting the second signal in accordance with the at least one operation.

Example 55

This example includes any or all of the features of example 54, wherein the at least one text message factor is selected from categorization factors, compartmentalization factors, and combinations thereof; the categorization factors are selected from the group consisting of a type of the message, a type of event at which the voice to text server is being employed, an identity of an entity generating the auditory information, and combinations thereof; and the compartmentalization factors are selected from the group consisting of the nature of information contained in the message, an importance rating, and combinations thereof.

Example 56

This example includes any or all of the features of any one of examples 54 and 55, wherein the at least one operation includes transmitting the second signal containing the message when at least one pre-determined text message factors is detected.

Example 57

This example includes any or all of the features of any one of examples 54 and 55, wherein the at least one operation includes transmitting the second signal via a predetermined form of wired or wireless communication.

Example 58

This example includes any or all of the features of any one of examples 54 and 55, wherein the predetermined form of wired or wireless communication is selected from the group consisting of a cellular phone network, a WiFi network, or a combination thereof.

Example 59

This example includes any or all of the features of any one of examples 54 and 55, wherein the at least one operation includes transmitting the second signal to a predetermined subscriber base.

Example 60

According to this example there is provided at least one computer readable medium having computer readable instructions stored thereon, wherein the instructions when executed by a processor cause the performance of the following operations including, in response to receipt of a first signal containing audio information from an audio sensor: converting the audio information to textual information; preparing a message containing at least a portion of the textual information; classifying the textual information to provide a message description; and transmitting a second signal containing the message and the message description to a mobile computing device.

Example 61

This example includes any or all of the features of example 60, wherein the first signal further includes a first level of noise, and the instructions when executed by the processor cause the performance of the following additional operations including: reducing the first level of noise to a second level of noise, prior to converting the audio information to textual information.

Example 62

This example includes any or all of the features of any one of examples 60 and 61, wherein the message is a short message service message, a WiFi network message, or a combination thereof.

Example 63

This example includes any or all of the features of any one of examples 60 to 62, wherein the second signal is transmitted to the mobile computing device over at least one of a WiFi network and a cellular network.

Example 64

This example includes any or all of the features of any one of examples 60 to 63, wherein the textual information is first textual information and the instructions when executed by the processor cause the performance of the following additional operations including: translating the first textual information into second textual information, the second textual information being different than the first textual information.

Example 65

This example includes any or all of the features of example 64, wherein the first textual information is in a first language, and the second textual information is in a second language.

Example 66

This example includes any or all of the features of any one of examples 60 to 65, wherein preparing the message includes including the message description as metadata associated with the message.

Example 67

This example includes any or all of the features of any one of examples 60 to 66, wherein the instructions when executed by the processor cause the performance of the following additional operations including: recording a copy of at least one of the textual information and the message in a message archive.

Example 68

This example includes any or all of the features of any one of examples 60 to 67, wherein the audio sensor includes a microphone.

Example 69

This example includes any or all of the features of example 68, wherein the microphone includes an array microphone.

Example 70

This example includes any or all of the features of any one of examples 60 to 69, wherein the mobile computing device is selected from the group consisting of a cellular phone, electronic reader, laptop computer, smart phone, tablet personal computer, portable television, ultra-mobile personal computer, or a combination thereof.

Example 71

This example includes any or all of the features of any one of examples 60 to 70, wherein the instructions when executed by the processor cause the performance of the following additional operations including: detecting at least one text message factor associated with the message; correlating at least one operation with the at least one text message factor; and performing at least one of the preparing the message and the transmitting the second signal in accordance with the at least one operation

Example 72

This example includes any or all of the features of example 71, wherein the at least one text message factor is selected from categorization factors, compartmentalization factors, and combinations thereof; the categorization factors are selected from the group consisting of a type of the message, a type of event at which the voice to text server is being employed, an identity of an entity generating the auditory information, and combinations thereof; and the compartmentalization factors are selected from the group consisting of the nature of information contained in the message, an importance rating, and combinations thereof.

Example 73

This example includes any or all of the features of any one of examples 71 and 72, wherein the at least one operation includes transmitting the second signal containing the message when at least one pre-determined text message factors is detected.

Example 74

This example includes any or all of the features of any one of examples 71 and 72, wherein the at least one operation includes transmitting the second signal via a predetermined form of wired or wireless communication.

Example 75

This example includes any or all of the features of any one of examples 71 and 72, wherein the predetermined form of wired or wireless communication is selected from the group consisting of a cellular phone network, a WiFi network, or a combination thereof.

Example 76

This example includes any or all of the features of any one of examples 71 and 72, wherein the at least one operation includes transmitting the second signal to a predetermined subscriber base.

Example 77

According to this example there is provided at least one computer readable medium including computer readable instructions which when executed by a processor of a system cause the system to perform the method of any one of examples 23 to 41.

Example 78

According to this example there is provided an apparatus for providing textual information, including: means for detecting auditory information with an audio sensor; means for transmitting a first signal containing the auditory information to a loudspeaker; means for converting the audio information to textual information; means for preparing a message containing at least a portion of the textual information; and means for transmitting a second signal containing the message to a mobile computing device.

Example 79

This example includes any or all of the features of example 78, wherein the first signal further includes a first level of noise, and the apparatus further includes means for reducing the first level of noise to a second level of noise prior to converting the audio information to textual information.

Example 80

This example includes any or all of the features of any one of examples 78 and 79, wherein the message is a short message service message, a WiFi network message, or a combination thereof.

Example 81

This example includes any or all of the features of any one of examples 78 to 80, wherein the second signal is transmitted to the mobile computing device over at least one of a WiFi network and a cellular network.

Example 82

This example includes any or all of the features of any one of examples 78 to 81, wherein the textual information is first textual information and the apparatus further includes means for translating the first textual information into second textual information, the second textual information being different than the first textual information.

Example 83

This example includes any or all of the features of example 82, wherein the first textual information is in a first language, and the second textual information is in a second language.

Example 84

This example includes any or all of the features of any one of examples 78 to 83, and further includes means for classifying the textual information in the message to provide a message description, and means for transmitting the message description in the second signal.

Example 85

This example includes any or all of the features of example 84, wherein the means for preparing the message includes the message description as metadata associated with the message.

Example 86

This example includes any or all of the features of any one of examples 78 to 85, and further includes means for recording a copy of at least one of the textual information and the message in a message archive.

Example 87

This example includes any or all of the features of any one of examples 78 to 86, wherein the means for detecting audio information includes a microphone.

Example 88

This example includes any or all of the features of any one of examples 78 to 87, wherein the microphone includes an array microphone.

Example 89

This example includes any or all of the features of any one of examples 78 to 88, wherein the mobile computing device is selected from the group consisting of a cellular phone, electronic reader, laptop computer, smart phone, tablet personal computer, portable television, ultra-mobile personal computer, or a combination thereof.

Example 90

This example includes any or all of the features of any one of examples 78 to 89, and further includes means for detecting at least one text message factor associated with the message; means for correlating at least one operation with the at least one text message factor; and at least one of the means for preparing the message and means for transmitting the second signal are respectively configured to prepare the message and transmit the second signal in accordance with the at least one operation.

Example 91

This example includes any or all of the features of example 90, wherein the at least one text message factor is selected from categorization factors, compartmentalization factors, and combinations thereof; the categorization factors are selected from the group consisting of a type of the message, a type of event at which the voice to text server is being employed, an identity of an entity generating the auditory information, and combinations thereof; and the compartmentalization factors are selected from the group consisting of the nature of information contained in the message, an importance rating, and combinations thereof.

Example 92

This example includes any or all of the features of any one of examples 90 and 91, wherein the at least one operation includes transmitting the second signal containing the message when at least one pre-determined text message factors is detected.

Example 93

This example includes any or all of the features of any one of examples 90 and 91, wherein the at least one operation includes transmitting the second signal via a predetermined form of wired or wireless communication.

Example 94

This example includes any or all of the features of any one of examples 90 and 91, wherein the predetermined form of wired or wireless communication is selected from the group consisting of a cellular phone network, a WiFi network, or a combination thereof.

Example 95

This example includes any or all of the features of any one of examples 90 and 91, wherein the at least one operation includes transmitting the second signal to a predetermined subscriber base.

Example 96

According to this example there is provided a client device for receiving textual information, including: a processor; a memory having a policy stored thereon; communications circuitry; a display; a reception module including logic implemented at least in part in hardware to cause the client device to, in response to receiving a signal including a message containing textual information, process the signal to obtain the message; and a policy enforcement module including logic implemented at least in part in hardware to determine one or more attributes of the message contained in the signal, identify display control parameters correlated to the one or more attributes in the policy, and determine whether or not to display the message on the display in accordance with the at least one display control parameters.

Example 97

This example includes any or all of the features of example 96, wherein the one or more attributes are selected from the group consisting of keywords in the message, a classification assigned to the message, an importance indicator, a type indicator, and combinations thereof.

Example 98

This example includes any or all of the features of any one of examples 96 and 97, wherein the each of the attributes is associated with a display score in the policy, and the policy enforcement module causes the client to display the message based at least in part on a comparison of a sum of the display scores for the one or more attributes of the message to a threshold display value.

Example 99

This example includes any or all of the features of any one of examples 96 to 98, wherein the policy enforcement module causes the client to display the message when the sum of the display scores meets or exceeds the threshold display value.

Example 100

This example includes any or all of the features of any one of examples 96 to 99, and further includes an archive for storing the message in the memory.

Example 101

According to this example there is provided a method for receiving textual information, including, in response to receipt of a signal containing a message including textual information with a client device: processing the second signal to obtain the message contained therein; determining one or more attributes of the message; identifying one or more display control parameters correlated to the one or more attributes; and determining whether or not to display the message on a display of the client device based at least in part on the one or more display control parameters.

Example 102

This example includes any or all of the features of example 101, wherein the one or more attributes are selected from the group consisting of keywords in the message, a classification assigned to the message, an importance indicator, a type indicator, and combinations thereof.

Example 103

This example includes any or all of the features of any one of examples 101 and 102, wherein the each of the attributes is associated with a display score, and the method further includes: determining whether or not to display the message on the display based at least in part on a comparison of a sum of the display scores for the one or more attributes of the message to a threshold display value.

Example 104

This example includes any or all of the features of example 103, and further includes causing the message to be displayed on the display when the sum of the display scores meets or exceeds the threshold display value.

Example 105

This example includes any or all of the features of any one of examples 101 to 104, and further includes archiving the message in a memory of the client device.

Example 106

According to this example there is provided at least one computer readable medium including instructions which when executed by a processor of a client device cause the client device to perform the following operations in response to receipt of a signal containing a message containing textual information: processing the second signal to obtain the message contained therein; determining one or more attributes of the message; identifying one or more display control parameters correlated to the one or more attributes; and determining whether or not to display the message on a display of the client device based at least in part on the one or more display control parameters.

Example 107

This example includes any or all of the features of example 106, wherein the one or more attributes are selected from the group consisting of keywords in the message, a classification assigned to the message, an importance indicator, a type indicator, and combinations thereof.

Example 108

This example includes any or all of the features of any one of examples 106 and 107, wherein the each of the attributes is associated with a display core, and the instructions when executed further cause the client device to perform the following operations including: determining whether or not to display the message on the display based at least in part on a comparison of a sum of the display scores for the one or more attributes of the message to a threshold display value.

Example 109

This example includes any or all of the features of example 108, wherein the instructions when executed further cause the client device to perform the following operations including: causing the message to be displayed on the display when the sum of the display scores meets or exceeds the threshold display value.

Example 110

This example includes any or all of the features of any one of examples 106 to 110, wherein the instructions when executed further cause the client device to perform the following operations including: archiving the message in a memory of the client device.

Example 111

According to this example there is provided at least one computer readable medium including computer readable instructions which when executed by a processor of a system cause the system to perform the method of any one of examples 101 to 105.

Example 112

According to this example there if provided an apparatus for receiving textual information, including: means for processing a signal containing a message including textual information to obtain the message contained therein; means for determining one or more attributes of the message; means for identifying one or more display control parameters correlated to the one or more attributes; and means for determining whether or not to display the message on a display of the apparatus based at least in part on the one or more display control parameters.

Example 113

This example includes any or all of the features of example 112, wherein the one or more attributes are selected from the group consisting of keywords in the message, a classification assigned to the message, an importance indicator, a type indicator, and combinations thereof.

Example 114

This example includes any or all of the features of any one of examples 112 and 113, the apparatus further including: means for determining whether or not to display the message on the display based at least in part on a comparison of a sum of the display scores for the one or more attributes of the message to a threshold display value.

Example 115

This example includes any or all of the features of example 114, wherein the means for determining causes the message to be displayed on the display when the sum of the display scores meets or exceeds the threshold display value.

Example 116

This example includes any or all of the features of any one of examples 112 to 115, and further includes: means for archiving the message in a memory of the apparatus.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system for providing textual information, comprising:
an audio sensor in communication with a loudspeaker and a voice to text server, the audio sensor configured to detect auditory information and transmit a first audio signal containing said auditory information to said loudspeaker and said voice to text server;
wherein said voice to text server comprises a processor, communications circuitry, and voice to text circuitry configured to cause the voice to text server to perform the following operations comprising, in response to receiving said first signal:
convert said audio information to textual information;
prepare a message containing at least a portion of said textual information; and
transmit a second signal containing a first copy of said message with said communications circuitry to all addresses of a Wi-Fi network, the Wi-Fi network configured to connect to a plurality of mobile computing devices; and
wherein said voice to text server is further configured, in response to a request from at least one of said plurality of mobile computing devices, to transmit a third signal containing second copy of said message to the at least one mobile computing device that issued the request.

2. The system of claim 1, wherein:
said first signal further comprises a first level of noise;
the system further comprises a noise reduction circuitry configured to cause the voice to text server to reduce the first level of noise to a second level of noise prior to converting the audio information to textual information.

3. The system of claim 1, wherein said message is a Wi-Fi network message.

4. The system of claim 1, wherein:
said textual information is first textual information; and
the voice to text circuitry further comprises translation circuitry configured to cause said voice to text server to translate said first textual information into second textual information, the second textual information being different than said first textual information.

5. The system of claim 4, wherein said first textual information is in a first language, and said second textual information is in a second language.

6. The system of claim 1, wherein the voice to text module further comprises classification circuitry configured to cause the voice to text server to classify the textual information in said message so as to provide a message description, and to transmit said message description in said second signal.

7. The system of claim 6, wherein said voice to text circuitry is further configured to cause said voice to text server to include said message description as metadata within or associated with said message.

8. The system of claim 1, wherein the second signal is configured to cause said mobile computing device to determine whether or not to display the textual information.

9. The system of claim 8, wherein said message comprises metadata describing said textual information, and said second signal is configured to cause one or more of said plurality of mobile computing devices to determine whether or not to display the textual information based at least in part on said metadata.

10. A method for providing textual information, comprising:
detecting auditory information with an audio sensor;
transmitting a first signal containing said auditory information to a loudspeaker and a voice to text server;
converting said audio information to textual information with said voice to text server;
preparing a message containing at least a portion of said textual information with said voice to text server; and
transmitting a second signal containing a first copy of said message from said voice to text server to all addresses over a Wi-Fi network, the Wi-Fi network configured to connect to a plurality of mobile computing devices; and
in response to a request from at least one of said plurality of mobile computing devices, to transmit a third signal containing second copy of said message to the at least one mobile computing device that issued the request.

11. The method of claim 10, wherein said first signal further comprises a first level of noise, and the method further comprises reducing said first level of noise to a second level of noise prior to converting said audio information to textual information.

12. The method of claim 10, wherein said message is a Wi-Fi network message.

13. The method of claim 10, wherein said textual information is first textual information and the method further comprises translating said first textual information into second textual information, the second textual information being different than said first textual information.

14. The method of claim 13, wherein said first textual information is in a first language, and said second textual information is in a second language.

15. The method of claim 10, further comprising classifying the textual information in said message to provide a message description, and transmitting said message description in said second signal.

16. The method of claim 15, wherein preparing said message comprises including said message description as metadata associated with said message.

17. The method of claim 10, wherein said audio sensor comprises an array microphone.

18. At least one non-transitory computer readable medium having computer readable instructions stored thereon, wherein said instructions when executed by a processor cause the performance of the following operations comprising:
   in response to receipt of a first signal containing audio information from an audio sensor:
      transmitting said audio information to at least one loudspeaker;
      converting said audio information to textual information;
      preparing a message containing at least a portion of said textual information; and
      transmitting a second signal containing a first copy of said message to all addresses of a Wi-Fi network, the Wi-Fi network configured to connect to a plurality of mobile computing devices; and
   in response to receipt of a request from at least one of said plurality of mobile computing devices:
      transmitting a third signal containing second copy of said message to the at least one mobile computing device that issued the request.

19. The at least one non-transitory computer readable medium of claim 18, wherein said first signal further comprises a first level of noise, and said instructions when executed by said processor cause the performance of the following additional operations comprising:
   reducing said first level of noise to a second level of noise prior to converting said audio information to textual information.

20. The at least one non-transitory computer readable medium of claim 18, wherein said message is a Wi-Fi network message.

21. The at least one non-transitory computer readable medium of claim 18, wherein said textual information is first textual information and the instructions when executed by said processor cause the performance of the following additional operations comprising:
   translating said first textual information into second textual information, the second textual information being different than said first textual information.

22. The at least one non-transitory computer readable medium of claim 21, wherein said first textual information is in a first language, and said second textual information is in a second language.

23. The at least one non-transitory computer readable medium of claim 18, wherein said instructions when executed by said processor cause the performance of the following additional operations comprising:
   classifying the textual information to provide a message description; and
   transmitting said message description in said second signal.

24. The at least one non-transitory computer readable medium of claim 23, wherein preparing said message comprises including said message description as metadata associated with said message.

25. The at least one non-transitory computer readable medium of claim 18, wherein said audio sensor comprises an array microphone.

* * * * *